United States Patent [19]
Bruckert et al.

[11] Patent Number: 5,129,855
[45] Date of Patent: Jul. 14, 1992

[54] FISH SCALER APPARATUS

[76] Inventors: Richard C. Bruckert, E10198A Kings Corner Rd., North Freedom, Wis. 53951; Paul L. Barebo, S2875 Hwy. 23, Reedsburg, Wis. 53959

[21] Appl. No.: 751,130

[22] Filed: Aug. 28, 1991

[51] Int. Cl.⁵ .............................. A22C 25/02
[52] U.S. Cl. ........................ 452/99; 366/330
[58] Field of Search ........ 452/98, 99; 366/64, 366/251, 292, 293, 330

[56] References Cited
U.S. PATENT DOCUMENTS

| | | | |
|---|---|---|---|
| 3,166,303 | 1/1965 | Chapman | 366/330 |
| 4,054,272 | 10/1977 | Cooke | 366/330 |
| 4,329,069 | 5/1982 | Graham | 366/330 |
| 4,508,455 | 4/1985 | Werman et al. | 366/330 |
| 4,726,095 | 2/1988 | Bissell, Jr. et al. | 452/99 |
| 4,763,386 | 8/1988 | Wissbroecker | 452/99 |

Primary Examiner—Willis Little
Attorney, Agent, or Firm—Leon Gilden

[57] ABSTRACT

A fish scaler to include an exterior cylindrical container mounting an interior cylindrical insert radially positioned within the exterior container by a matrix of positioning blocks directed to an exterior surface thereabout. A central axle is directed coaxially of the container and exterior bucket projecting through a lid for accommodating a drill to permit its rotation. The axle includes a central conduit, with exterior ports to effect washing of fish directed within the container, with the ports in fluid communication with a fluid source, such as a garden hose and the like. Interior projections cooperate with paddles mounted to the axle for effecting the descaling of fish.

8 Claims, 4 Drawing Sheets

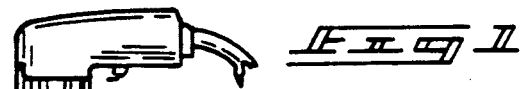
Fig. 1
PRIOR ART
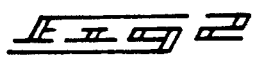
Fig. 2
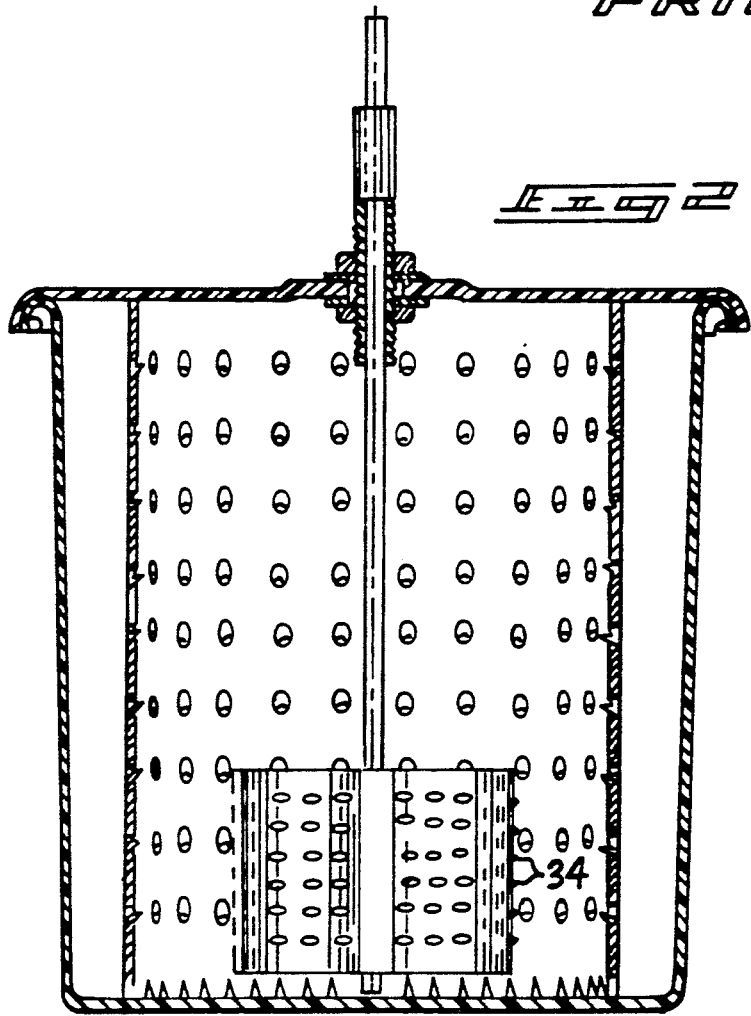
PRIOR ART

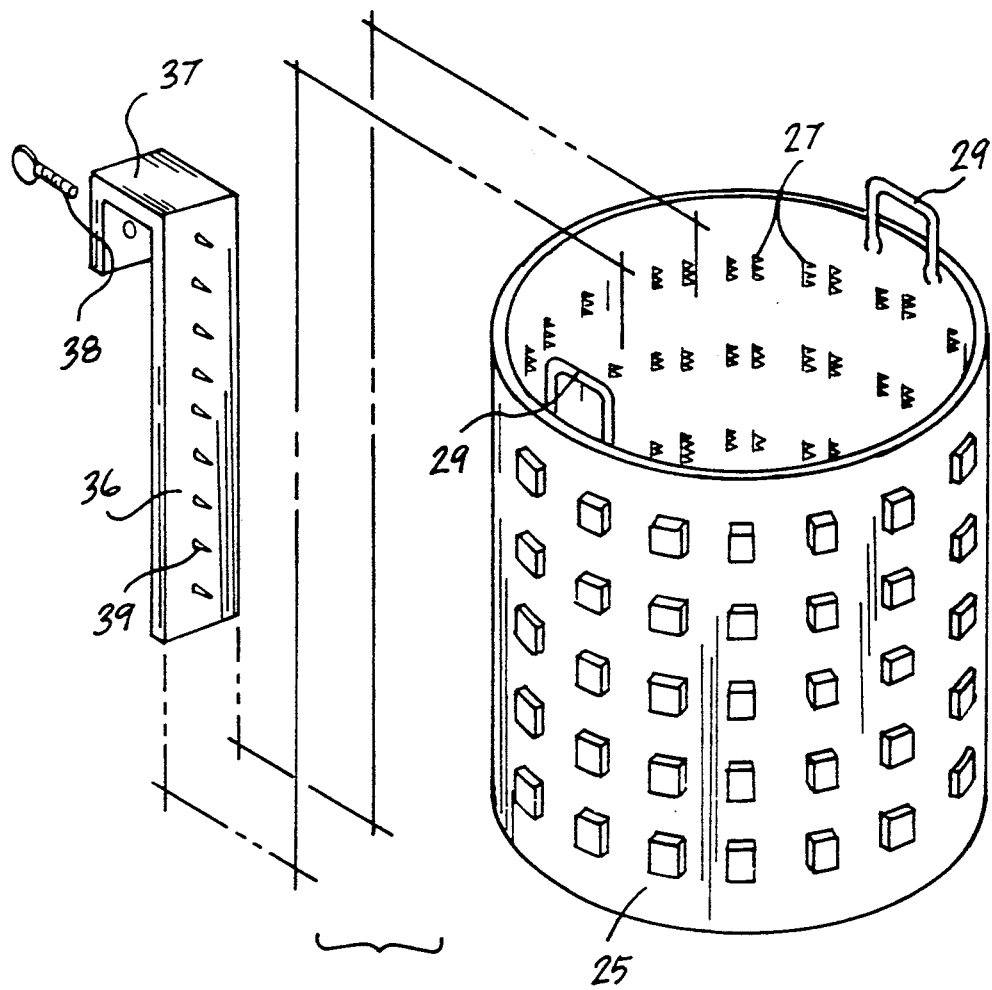
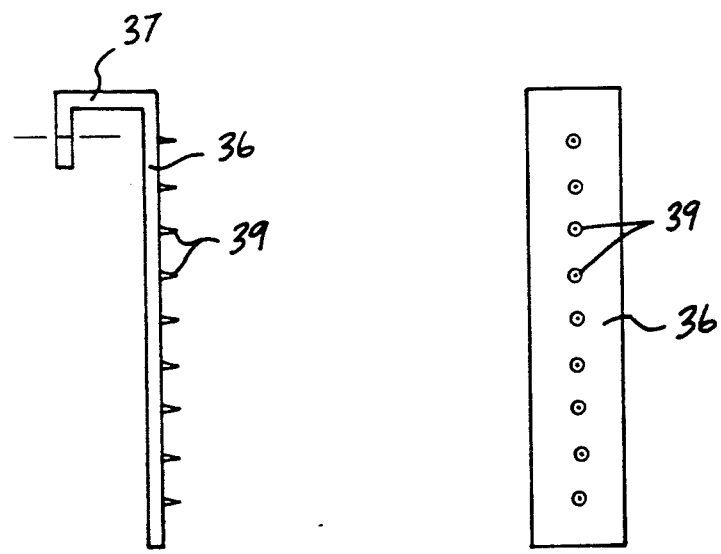

FISH SCALER APPARATUS

BACKGROUND OF THE INVENTION

1. Field of the Invention

The field of invention relates to fish scaling apparatus, and more particularly pertains to a new and improved fish scaler apparatus wherein the same is directed to the effective descaling of various categories of fish.

2. Description of the Prior Art

Rotary type devices for removing scales from fish are known in the prior art, generally involving the rotation of a drum to include fish to be scaled therewithin. Such apparatus is exemplified in U.S. Pat. No. 4,763,386 to Wissbroecker wherein an interior drum is cooperative with a rotary scaling drum positioned within the drum, wherein fish are descaled within the drum structure.

U.S. Pat. No. 4,839,942 to Damp U.S. Pat. No. 4,945,608 to Majure; U.S. Pat. No. 4,875,255 to Kent, Jr.; and U.S. Pat. No. 4,876,768 to Bright are further examples of drum descaling apparatus.

The instant invention attempts to overcome deficiencies of the prior art by providing a drum scaling apparatus to accommodate scaling of various types of fish by permitting further modification of the density of projections positioned within the descaling drum or cylindrical insert within the exterior container.

SUMMARY OF THE INVENTION

In view of the foregoing disadvantages inherent in the known types of fish scaler apparatus now present in the prior art, the present invention provides a fish scaler apparatus wherein the same is directed to the effective descaling of fish contained within a cylindrical insert rotatably mounted within an exterior container. As such, the general purpose of the present invention, which will be described subsequently in greater detail, is to provide a new and improved fish scaler apparatus which has all the advantages of the prior art fish scaler apparatus and none of the disadvantages.

To attain this, the present invention provides a fish scaler to include an exterior cylindrical container mounting an interior cylindrical insert radially positioned within the exterior container by a matrix of positioning blocks directed to an exterior surface thereabout. A central axle is directed coaxially of the container and exterior bucket projecting through a lid for accommodating a drill to permit its rotation. The axle includes a central conduit, with exterior ports to effect washing of fish directed within the container, with the ports in fluid communication with a fluid source, such as a garden hose and the like. Interior projections cooperate with paddles mounted to the axle for effecting the descaling of fish.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fish scaler apparatus which has all the advantages of the prior art fish scaler apparatus and none of the disadvantages.

It is another object of the present invention is provide a new and improved fish scaler apparatus which may be easily and efficiently manufactured and marketed.

It is a further object of the present invention to provide a new and improved fish scaler apparatus which is of a durable and reliable construction.

An even further object of the present invention is to provide a new and improved fish scaler apparatus which is susceptible of a low cost of manufacture with regard to both materials and labor, and which accordingly is then susceptible of low prices of sale to the consuming public, thereby making such fish scaler apparatus economically available to the buying public.

Still yet another object of the present invention is to provide a new and improved fish scaler apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of a prior art fish scaler apparatus.

FIG. 2 is an orthographic cross-sectional illustration of the fish scaler apparatus as set forth in FIG. 1 available in the prior art.

FIG. 6 is an orthographic frontal view of the hanger structure.

FIG. 8 is an isometric illustration of an insert scraper hanger utilized by the invention.

FIG. 9 is an orthographic side view of the hanger, as illustrated in FIG. 8.

DESCRIPTION OF THE PREFERRED EMBODIMENT

Figure 3:
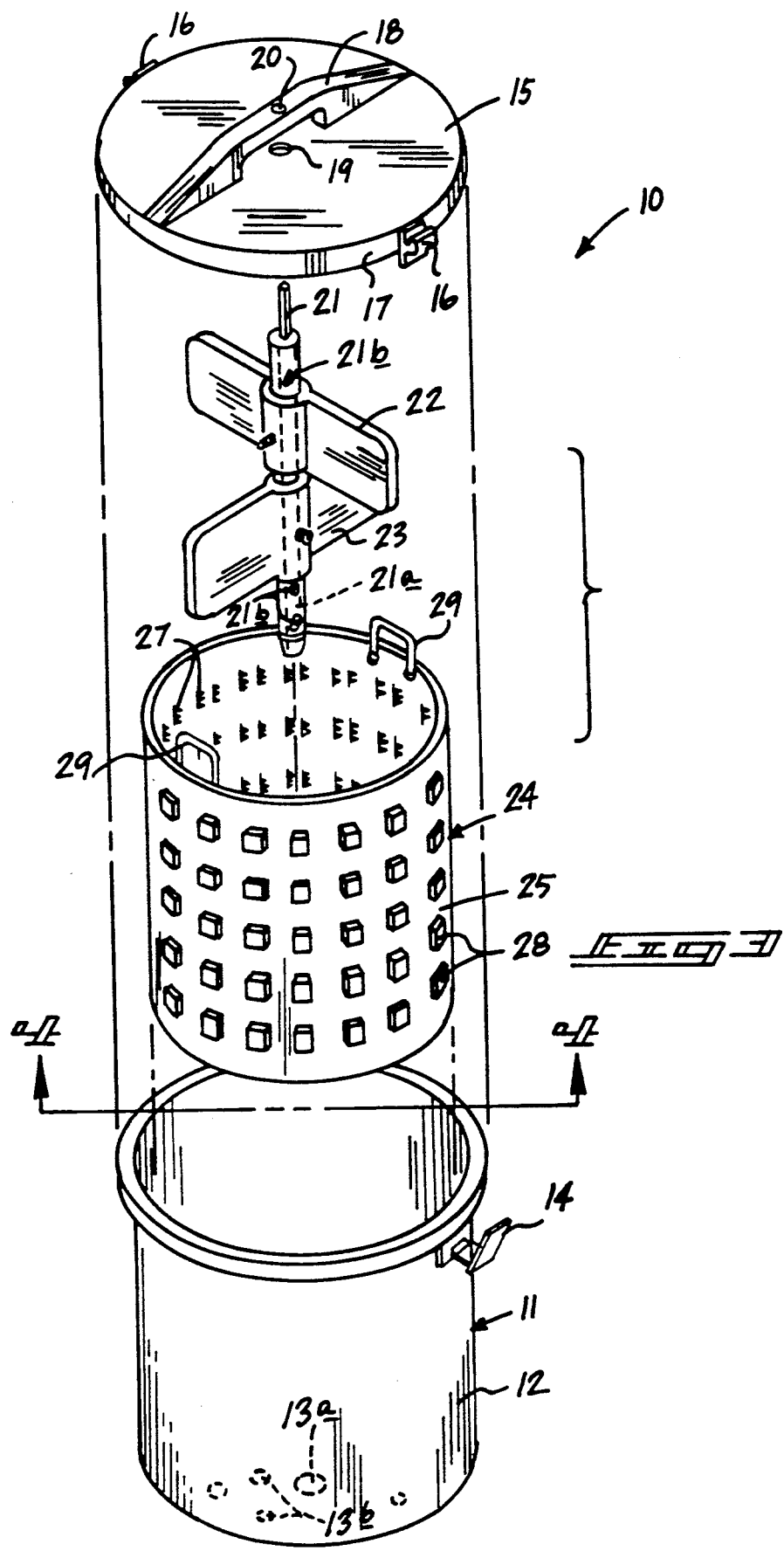
FIG. 3 is an isometric illustration, somewhat exploded, of the instant invention illustrating the various components thereof.
Figure 4:
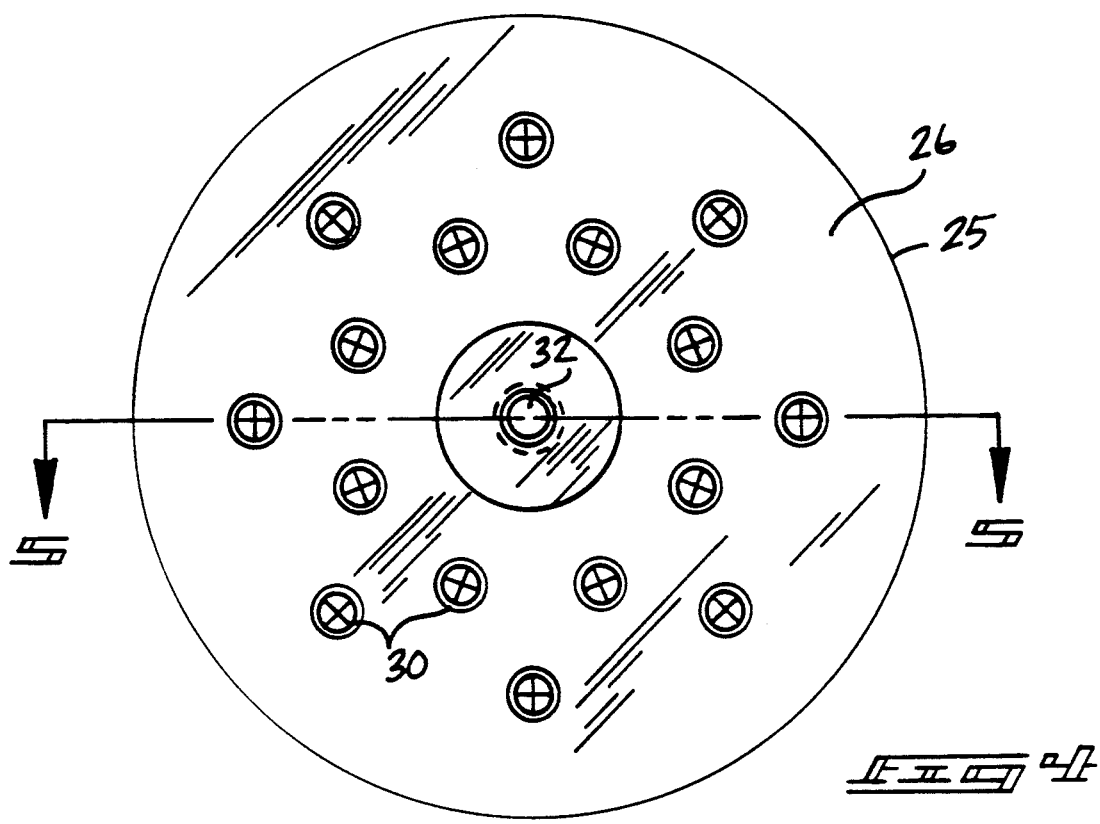
FIG. 4 is an orthographic view, taken along the lines 4—4 of FIG. 3 is the direction indicated by the arrows.
Figure 5:
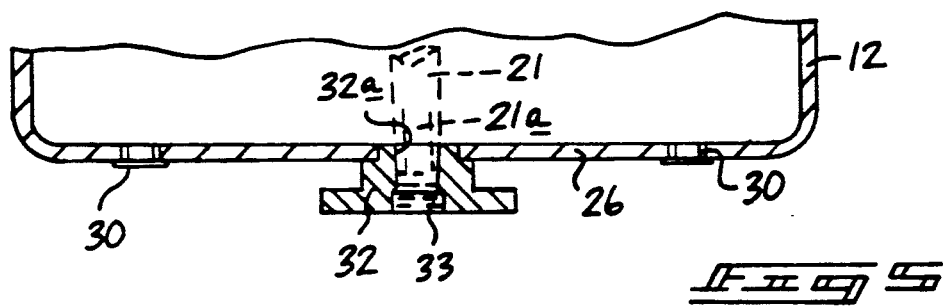
FIG. 5 is an orthographic view, taken along the lines 5—5 of FIG. 4 in the direction indicated by the arrows.
Figure 7:
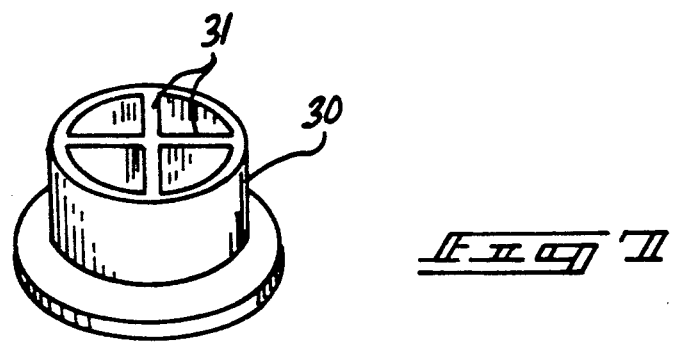
FIG. 7 is an isometric illustration of an insert floor drain opening utilized by the invention.

With reference now to the drawings, and in particular to FIGS. 1 to 9 thereof, a new and improved fish scaler apparatus embodying the principles and concepts of the present invention and generally designated by the reference numeral 10 will be described.

FIG. 1 and FIG. 2 are illustrative of a prior art fish scaler apparatus as set forth in U.S. Pat. No. 4,763,386, wherein a rotary drill mounts a central axle to rotate a scraping drum within a drum container utilizing various cutting apertures for effecting the scaling of the fish in association with the projections 34 mounted to the cutting drum at the lower terminal end of the axle.

More specifically, the fish scaler apparatus 10 of the instant invention essentially comprises a cylindrical container 11 defined by a cylindrical side wall 12, with a planar bottom wall 13. The container bottom wall includes a coaxially positioned container bottom wall opening 13a, with a plurality of bottom wall drain openings 13b directed therethrough. A plurality of latches 14 are mounted adjacent an upper terminal end of the cylindrical side wall 11 to cooperate with lid latches 16 mounted to a lid cylindrical skirt 17 of an associated container lid 15. The container lid 15 includes a lid handle 18 diametrically mounted to an upper surface of the lid 15, with the lid handle 18 including a lid axial bore 19 coaxially directed through the lid 15, with a handle axial bore 20 coaxially aligned with the lid axial bore 19 to receive a drive shaft 21 therethrough for mounting of a rotary drill and the like thereon, in a manner as illustrated in FIG. 1. The draft shaft 21 includes respective first and second paddle plates 22 and 23 mounted to the drive shaft 21, wherein the paddle plates 22 and 23 are orthogonally aligned relative to one another and positioned between an upper and lower terminal edge of the drive shaft 21. The drive shaft 21 further includes a drive shaft conduit 21a originating from a lower terminal end of the drive shaft, with a plurality of conduit bores 21b directed through the drive shaft radially thereof for permitting optional flow of water into the associated cylindrical insert 24 of the organization during a fish cleaning procedure. The cylindrical insert 24 includes an insert cylindrical wall 25 and a planar insert floor 26. A matrix of insert wall interior projections 27 are mounted throughout the interior surface of the insert cylindrical wall 25, with a matrix of insert wall exterior spacer blocks 28 mounted to an exterior surface of the insert wall to properly align the insert 24 coaxially relative to the container 11 when positioned therewithin. A plurality of insert handles 29 are diametrically mounted relative to one another adjacent an upper terminal edge of the insert cylindrical wall 25 and may be pivotally mounted thereto to permit folding of the handles to provide an insert of an axial height substantially equal to the axial height of the container cylindrical side wall 12. A plurality of insert floor drain openings 30 are directed through the insert floor 26. The insert floor drain openings 30 include partition walls 31 to prevent fish scales from being directed through the drain openings 30 in use of the organization. An insert shaft bushing 32 is coaxially aligned with and directed orthogonally through the insert floor 26 to include an internally threaded hose fitting 33 through a lower terminal end thereof to receive a fluid hose connection thereto to direct fluid into the drive shaft conduit 21a. The drive shaft conduit 21a is further formed with a lower conical terminal end to be complementarily received within the conical opening 32a of the shaft bushing 32.

FIGS. 8-10 illustrate the use of an insert plate scraper hanger structure 36, wherein a single or plurality of such hangers may be mounted within the cylindrical insert 34 to provide greater density of cleaning projections utilized in the scraping of various fish, wherein such various fish may be formed with a greater number of scales per square inch to thereby provide for an organization to accommodate various categories of fish and efficient cleaning or descaling procedure. To this end, the insert plate hangers 36 are mounted to "L" shaped mounting flanges 37, wherein the "L" shaped mounting flanges each include a locking fastener 38 that is directed through the mounting flange 37 orthogonally oriented towards a rear surface of the hanger 36 to latch each hanger 36 relative to the insert cylindrical wall 25. A plurality of conical scraper projections 39 are threadedly secured to the hangers 36 to permit use of various types of projections, wherein typically, the conical scraper projections 39 (see FIG. 8) include a plurality of rows of cup-shaped scraping vanes 40 mounted to an interior surface of each conical scraper projection 39. The rows are offset relative to one another, and wherein each of the conical scraper projections 30 includes a threaded shank 41 receivable within a threaded bore 42 formed within the hanger 36. Each of the vanes include vane conduits 43 through-extending the vanes to prevent pressure buildup within a forward surface of the vane and permit improved scraping of the vanes against an associated fish in a descaling procedure.

As to the manner of usage and operation of the instant invention, the same should be apparent from the above disclosure, and accordingly no further discussion relative to the manner of usage and operation of the instant invention shall be provided.

With respect to the above description then, it s to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fish scaler apparatus, comprising,
    a container including a container cylindrical side wall, with a container cylindrical planar bottom wall, the planar bottom wall includes a coaxially oriented container bottom wall opening, with a plurality of container bottom wall drain apertures directed therethrough, and
    the container cylindrical side wall includes a plurality of container latches mounted to an upper terminal end of the container cylindrical side wall, and a container lid, the container lid including a container lid cylindrical skirt, with the cylindrical skirt including a plurality of lid latches arranged for cooperation with the container latches for securement of the lid to the container, and
    the container lid including a lid handle permitting ease of transport of the container lid and the container when in assembled configuration, with the lid handle including a lid axial bore directed therethrough, with the lid axial bore coaxially aligned through the container lid, and
    the lid handle including a handle axial bore coaxially aligned with the lid axial bore, the lid axial bore and the handle axial bore rotatably receive a drive shaft therethrough, the drive shaft arranged for securement to an associated rotary drill, and the drive shaft extending interiorly of the container, the drive shaft including a respective first and second paddle plate orthogonally oriented relative to one another mounted to the drive shaft, and
    the drive shaft including a lower conical terminal end, and
    a cylindrical insert positioned within the container receiving the drive shaft coaxially therewithin.

2. An apparatus as set forth in claim 1 wherein the cylindrical insert includes an insert cylindrical wall, the cylindrical insert wall includes a matrix of insert wall exterior spacer blocks fixedly mounted to the insert cylindrical wall into an exterior thereof to maintain alignment of the cylindrical insert relative to the container cylindrical side wall, and an interior surface of the insert cylindrical wall includes a matrix of insert wall interior projections extending interiorly of the cylindrical insert, and the drive shaft and the first paddle plate and the second paddle plate are positioned within the cylindrical insert and the drive shaft lower conical end is receivable within an insert shaft bushing, the shaft bushing including a shaft bushing conical opening to receive the lower terminal end of the drive shaft in a sealing complementary relationship, and the shaft bushing including an internally threaded bore to receive a conduit hose secured thereto.

3. An apparatus as set forth in claim 2 wherein the insert floor includes a plurality of insert floor drain openings, each of the insert floor drain openings includes a plurality of partition walls preventing egress of fish scales therethrough.

4. An apparatus as set forth in claim 3 wherein the insert cylindrical wall includes a plurality of insert wall handles diametrically mounted relative to one another to an upper terminal end of the insert cylindrical wall, the insert handles are pivotally mounted relative to the insert cylindrical wall.

5. An apparatus as set forth in claim 4 wherein the drive shaft includes a drive shaft conduit originating at the drive shaft lower terminal end and extending into the drive shaft spaced from a drive shaft upper terminal end, and the drive shaft conduit is in fluid communication with a plurality of drive shaft conduit bores directed through the drive shaft to direct fluid into the cylindrical insert.

6. An apparatus as set forth in claim 5 including at least one insert plate scraper hanger securable to the insert cylindrical wall, the insert plate scraper hanger includes an "L" shaped mounting flange, wherein the mounting flange includes a locking fastener directed through the mounting flange orthogonally oriented relative to an exterior surface of the insert cylindrical wall.

7. An apparatus as set forth in claim 6 wherein the insert plate scraper hanger includes a plurality of conical scraper projections selectively securable thereto, wherein each of the scraper projections includes a threaded shank, and the scraper hanger includes a matrix of threaded bores to receive a threaded shank of a respective scraper projection.

8. An apparatus as set forth in claim 7 wherein each of the conical scraper projections includes a plurality of rows of offset scraping vanes, each of the scraping vanes of a generally cup-shaped configuration and wherein each of the scraper vanes includes at least one vane conduit directed therethrough to prevent pressure buildup relative to a forward surface of a respective one of said scraper vanes.

* * * * *